US006860558B1

(12) United States Patent
Guillot

(10) Patent No.: US 6,860,558 B1
(45) Date of Patent: Mar. 1, 2005

(54) LOCKING MECHANISM FOR GLIDER CHAIRS IN RECREATIONAL VEHICLES

(75) Inventor: Edmond P. Guillot, Conover, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 42 days.

(21) Appl. No.: 10/248,657

(22) Filed: Feb. 5, 2003

(51) Int. Cl.[7] ............................................. A47D 13/10
(52) U.S. Cl. ................. 297/273; 297/270.1; 297/270.4; 297/344.1; 297/344.11; 248/429; 296/65.09
(58) Field of Search ........................... 297/270.1, 270.2, 297/270.3, 270.4, 344.1, 344.11, 344.18; 248/429, 430; 296/65.09

(56) References Cited

U.S. PATENT DOCUMENTS

| | | | | |
|---|---|---|---|---|
| 4,707,030 A | * | 11/1987 | Harding ....................... 297/341 |
| 4,813,643 A | * | 3/1989 | Nihei ........................... 248/430 |
| 5,082,328 A | * | 1/1992 | Garelick ................... 297/344.1 |
| 5,104,084 A | | 4/1992 | Kumagai et al. ........... 248/430 |
| 5,125,611 A | * | 6/1992 | Cox ............................ 248/429 |
| 5,259,257 A | * | 11/1993 | Mouri .......................... 248/429 |
| 5,597,206 A | * | 1/1997 | Ainsworth et al. ..... 297/378.12 |
| 5,785,292 A | * | 7/1998 | Muraishi et al. ............ 248/429 |
| 5,799,920 A | * | 9/1998 | Wittkowsky et al. ....... 248/429 |
| 5,842,383 A | | 12/1998 | Yamada et al. ............... 74/528 |
| 5,918,847 A | | 7/1999 | Couasnon .................... 248/430 |
| 5,931,436 A | | 8/1999 | Rohee ......................... 248/430 |
| 6,000,757 A | * | 12/1999 | Sovis ....................... 297/344.1 |
| 6,036,267 A | | 3/2000 | Downey et al. ............. 297/341 |
| 6,098,946 A | | 8/2000 | Sechet et al. ................ 248/424 |
| 6,106,062 A | * | 8/2000 | Ambrose et al. ........... 297/281 |
| 6,113,051 A | | 9/2000 | Moradell et al. ........... 248/430 |
| 6,161,892 A | | 12/2000 | Chabanne et al. ........ 296/65.03 |
| 6,352,312 B1 | * | 3/2002 | Rees ........................... 297/470 |
| 6,588,850 B2 | * | 7/2003 | Matsuo ........................ 297/473 |
| 6,616,230 B2 | * | 9/2003 | Niikura ....................... 297/311 |

* cited by examiner

Primary Examiner—Peter M. Cuomo
Assistant Examiner—Erika Garrett
(74) Attorney, Agent, or Firm—Kennedy Covington Lobdell & Hickman, LLP

(57) ABSTRACT

A glider chair in a recreational vehicle including a frame suspended from a base by a gliding mechanism for movement of the frame in a horizontal back-and-forth gliding motion relative to the base and a locking mechanism selectively operable to disable the gliding motion of the chair relative to the base. The locking mechanism has a locking plate mounted on a rotatable arm secured in a base from the chair to move pivotally between an inactive position wherein the plate is spaced from the suspended portion of the glider mechanism and a locking position where the plate engages a frame member of the suspended portion of the glider mechanism to prevent horizontal back-and-forth motion of the frame member relative to the base.

17 Claims, 4 Drawing Sheets

LOCKING MECHANISM FOR GLIDER CHAIRS IN RECREATIONAL VEHICLES

BACKGROUND OF INVENTION

The present invention relates to glider chairs used in recreational vehicles, trailers, vans, campers and other mobile vehicles, and more specifically to a locking mechanism for selectively disabling the horizontal, back-and-forth, "gliding" motion of the glider chairs in such vehicles.

Many recreational vehicles include glider chairs to provide additional comfort to the occupants of the recreational vehicles. The glider chairs include a glider mechanism designed to suspend the chair from a base by a series of pivoting arms which enables the chair to execute a back-and-forth horizontal motion more commonly referred to as "gliding." Such chair provide a comfortable respite and may also help alleviate some symptoms of motion sickness by offering movement that counters some of the vehicle's movement, especially over rough or uneven travel surfaces.

However, there may be times that such gliding motion is not desired, either for reasons of safety, comfort, or choice. In such cases, the gliding movement of the chair must be halted and the chair placed in a stationary position relative to the base. This disablement of the gliding movement must be selectable so that the person using the chair may choose between having the movement and having the chair stationary. Thus, a mechanism for selectively stopping the gliding motion is desired.

It is further desired that such a mechanism be easily used, even while the person is sitting in the chair. Also, such a mechanism should be self-contained and can be used without additional tools. Finally, the mechanism should securely engage the chair to prevent any unexpected shifting of the chair due to the mechanism failing to fully halt the gliding motion.

Regarding chairs or seats used in vehicles, prior inventions have concentrated on providing discrete, step-like, movements, for example moving a seat forward or backward relative to the dashboard of a vehicle and raising or lowering the seat relative to the vehicle floor. Several examples of such mechanisms can be found, for example U.S. Pat. No. 5,104,084 issued to Kumagai (sliding a seat between discrete locations relative to the dashboard); U.S. Pat. No. 5,785,292 issued to Muraishi (raising and lowering the seat). The above patents disclosed mechanisms the move the seat from one, stationary, position to another, stationary position in discrete steps. The mechanisms do not allow the user of the seat to choose to let the seat freely move. Rather, the seat only moves to change position—the seat is ordinarily and otherwise stationary.

Thus, it is desirable to have a locking mechanism for glider chairs that is easily used and that allows a person to choose between the chair having a constant gliding motion and the gliding motion being completely restrained.

SUMMARY OF INVENTION

Briefly described, the present invention is a glider chair in a recreational vehicle having a frame suspended from a base by a gliding mechanism for movement of the frame in a horizontal back-and-forth gliding motion relative to the base, and a locking mechanism selectively operable to disable the gliding motion of the chair relative to the base. The locking mechanism includes a rotatable arm affixable to and supported by the base. A latch plate is attached to the arm such that when the arm is in the locked position, the latch plate engages the frame, creating a rigid connection between the frame and the base and, hence, stopping any horizontal back-and-forth movement of the frame relative to the base. When the arm is in the unlocked position, the latch plate disengages from the frame, eliminating the rigid connection between the frame and the base and, hence, allowing the chair to freely move with a "gliding" motion relative to the base. The arm extends beyond the base toward the front of the chair so that a person sitting in the chair can easily move the arm between the locked and unlocked positions. The arm terminates in an handle to further improve the manipulation of the locking mechanism.

In a preferred embodiment, a guard is wrapped around a portion of the frame that engages the latch plate to prevent the latch plate from rubbing on the surface of the frame and possibly causing erosion of the frame. The guard is preferably made of a plastic material and more preferably from a high density polyethylene.

In a preferred embodiment, the arm extends between two generally parallel members of the base. In such a position, the arm is supported against lateral motion by the two members of the base, thus having the latch plate engage the frame in approximately the same location upon the frame each time the arm is rotated between the locked and unlocked positions, or vice versa.

In a preferred embodiment, the latch plate contains a cutout, shaped as a slot or channel, into which a portion of the frame may be inserted when the latch plate engages the frame. When a portion of the frame is enmeshed with the latch plate in such a manner, the frame is unable to slip from the latch plate or otherwise loosen the confinement of the latch plate on the frame. Thus, when the locking mechanism is engaged (i.e., the arm is in the locked position), the frame is in rigid connection with the base and the chair is prevented from any horizontal, gliding motion. Preferably, the edge of the latch plate in contact with the frame is angled toward the cutout, located intermediate opposing sides of the latch plate. The angled edges allow the frame to slide toward the cutout, thus properly aligning the frame with the latch plate when the latch plate engages the frame to prevent the gliding motion.

In one embodiment, the locking mechanism is installed on the glider chair during manufacture or installation of the chair in the vehicle. In another embodiment, the locking mechanism may be installed on an existing glider chair.

Although the glider chair of the present invention is in a recreational vehicle, the glider chair with the aforementioned locking mechanism may be in a home or business.

BRIEF DESCRIPTION OF DRAWINGS

Further features, embodiments, and advantages of the present invention will become apparent from the following detailed description with reference to the drawings, wherein.

DETAILED DESCRIPTION

In the following description, and for purposes of this invention, a glider chair includes a base, a frame, and a glider mechanism. Commonly, the glider mechanism is made of a series of pivoting arms that suspends the frame of the chair from the base and provides a horizontal, back-and-forth movement of the frame relative to the base. Such movement is referred to as "gliding." The balance of the chair is built onto the frame opposite the glider mechanism. Thus, as the frame moves, so too moves the chair, relative to the base.

Figure 1:
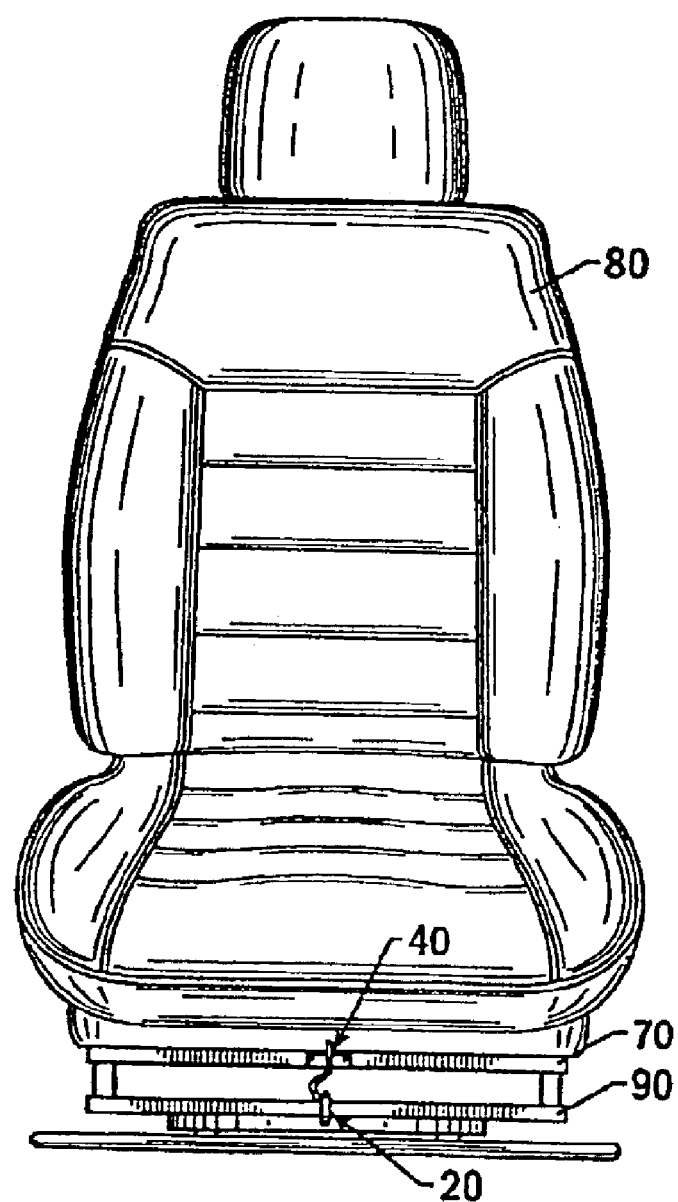
FIG. 1 illustrates the locking mechanism of the present invention as installed on a glider used in a recreational vehicle.
Figure 2A:
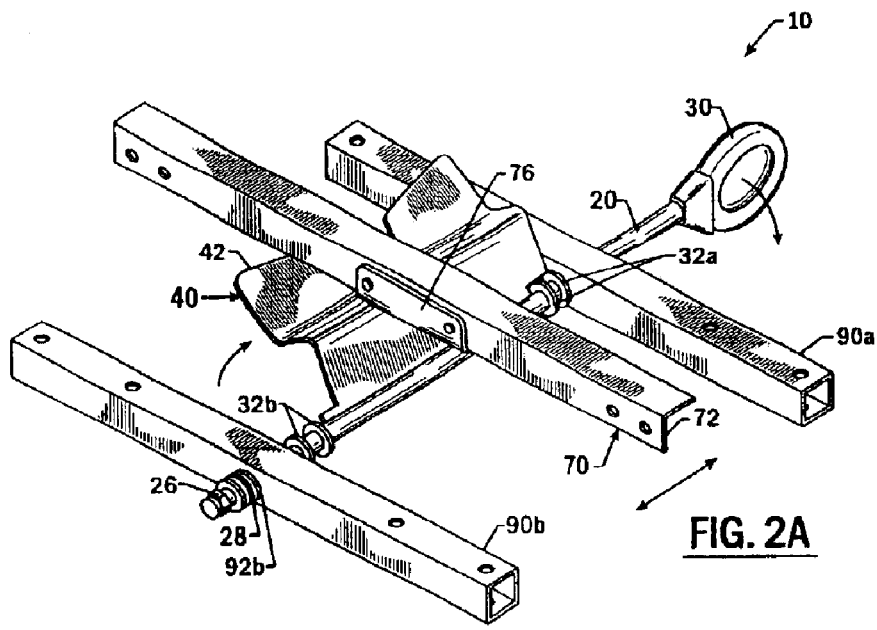
FIG. 2A is a perspective view, illustrating the locking mechanism in an unlocked position.
Figure 2B:
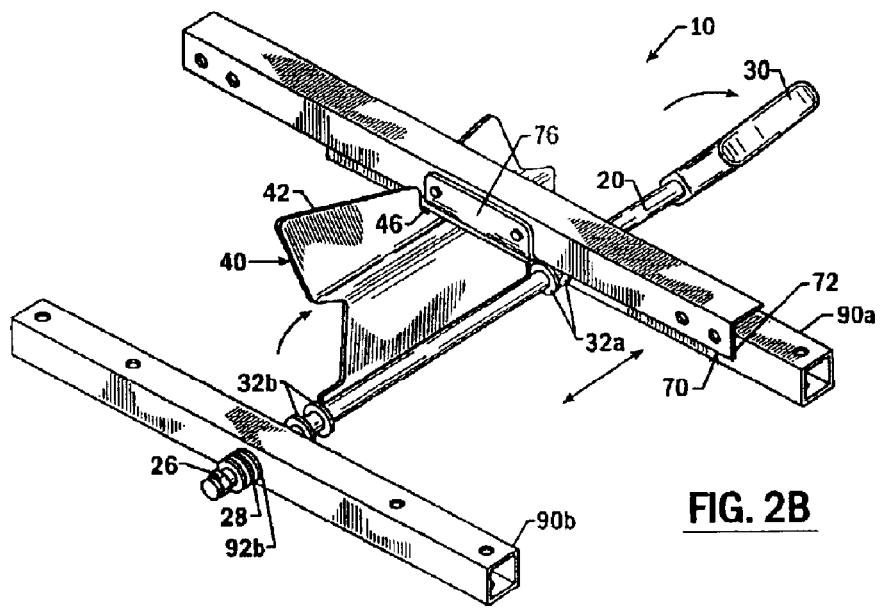
FIG. 2B is a perspective view, illustrating an intermediate position wherein the locking mechanism is being selectively manipulated from the unlocked position to a locked position.
Figure 2C:
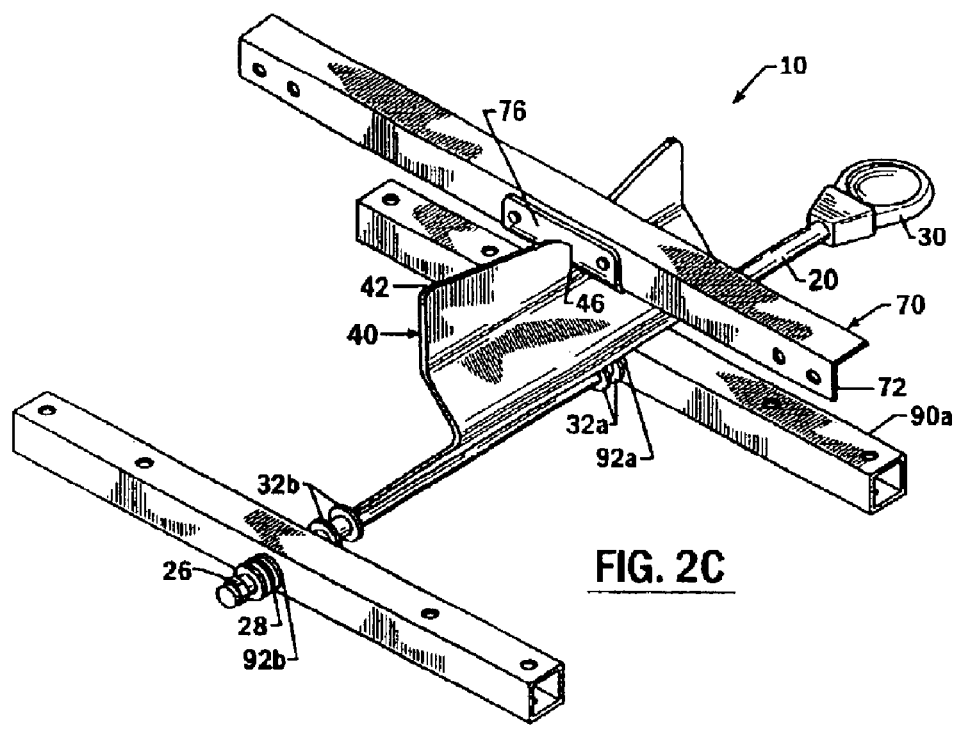
FIG. 2C is a perspective view, illustrating the locking mechanism in the locked position.

Referring now to FIG. 1, a locking mechanism 10 for a glider chair 80 placed in a recreational vehicle is used to selectively prevent the gliding motion of the chair 80. The locking mechanism 10 has latch plate 40 attached to a rotatable arm 20. The rotatable arm 20 is integral to the base 90 for pivotal movement thereof. The latch plate 40 attached to the rotatable arm 20 provides selective engagement of a portion of the frame 70 of the chair 80. When the rotatable arm 20 is in a locked position, the latch plate 40 engages the portion of the frame 70, creating a rigid linkage between the frame 70 and the base 90, thus preventing the gliding motion of the chair 80 relative to the base 90, as illustrated in FIG. 2C. When the rotatable arm 20 is in an unlocked position, the latch plate 40 disengages from the frame 70, thereby allowing the chair 80 to execute the gliding motion relative to the base 90, a shown in FIG. 2A.

Figure 4:
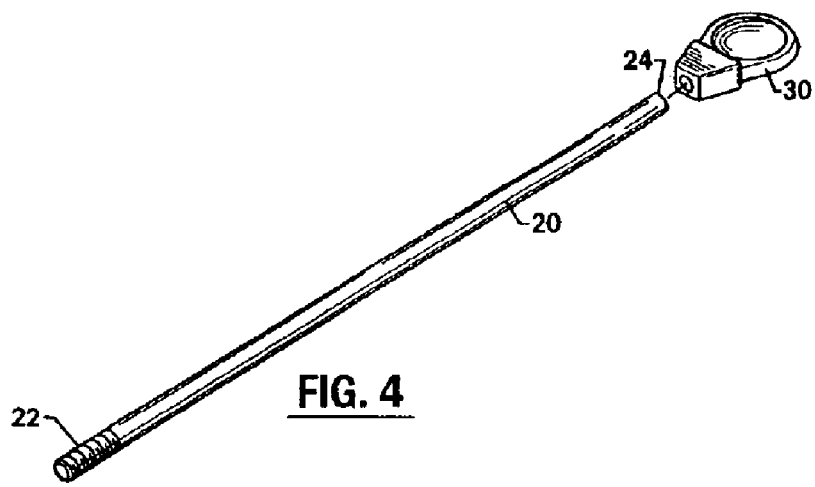
FIG. 4 is a perspective view illustrating a rotatable arm and handle portions of the locking mechanism.

As illustrated in FIG. 4, the rotatable arm 20 has a first end 22 and a second end 24. The arm 20 has a generally circular cross-section for facilitating pivotal movement thereof. In a preferred embodiment, illustrated in FIGS. 2A–2C, the arm 20 is supported by two rails 90a, 90b of the base 90. The first end 22 of the arm 20 is inserted into an opening 92a in a first rail 90a. The arm 22 continues through the first rail 90a and into an opening 92b in a second rail 90b. The first end 22 of the arm 20 protrudes from the opening 92b in the second rail 90b opposite the first rail 90a. Fastener 26, for example a nut, locking ring or locking pin, is attached to the first end 22 to prevent removal of the arm 20 from the base 90. Conical washer 28 surrounds the arm 20 and is disposed between the fastener 26 and the second rail 90b, to allow the arm 20 to rotate within the openings 92a, 92b of the rails 90a, 90b. Spacers 32a, 32b placed around a portion of the arm 20 between the first and second rails 90a, 90b prevent the arm 20 from being displaced laterally relative to the first and second rails 90a, 90b of the base 90.

Figure 3:
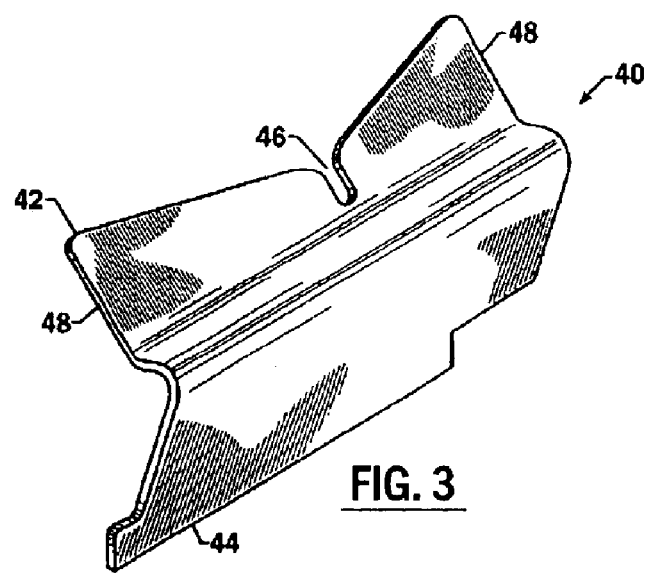
FIG. 3 is a perspective view showing a latch plate portion of the locking mechanism.

The latch plate 40 is a shaped structural material having a first edge 42 and a second edge 44 opposite the first edge 42, as shown in FIG. 3. The latch plate 40 is attached at the second edge 44 to a portion of the rotatable arm 20 disposed between the spacers 32a, 32b, as illustrated in FIGS. 2A–2C. The manner of attaching the latch plate 40 to the arm 20 includes welding, brazing, or other similar permanent attachment method. Preferably, the second edge 44 of the latch plate 40 is welded to the arm 20. The latch plate 40 is shaped so that the first edge 42 is in the same general orientation relative to the rails 90a, 90b of the base 90 when the arm 20 is in the locked position to allow the latch plate 40 to engage the frame 70; the first edge 42 is generally perpendicular to the rails 90a, 90b of the base 90 when the arm 20 is in the unlocked position so that the latch plate 40 is disengaged from the frame 70.

In a preferred embodiment, shown in FIG. 3, the first edge 42 of the latch plate 40 has a cutout 46 formed in the latch plate 40 intermediate opposing sides 48 of the latch plate 40. A portion of the frame 70 is insertable into the cutout 46 when the latch plate 40 engages the frame 70. The cutout 46 is formed to accept the shape of the frame 70 therein. For example, as illustrated in FIGS. 2B and 2C, the cutout 46 is shaped as a slot to accept a leg 72 of the L-shaped cross section of the frame 70. The enmeshment of a portion of the frame 70 with the first edge 42 of the latch plate 40 securely links the frame 70 to the base 90 to prevent any unexpected gliding motion of the chair 80 when the arm 20 is in the locked position.

In a preferred embodiment, also shown in FIG. 3, portions of the first edge 42 extending between the cutout 46 to the opposing sides 48 of the latch plate 40 are angled such that the frame 70 is guided toward the cutout 46 when the latch plate 40 is engaging the frame 70. These angled portions of the first edge 42 ensure that the frame 70 enmeshes with the cutout 46 when the arm 20 is in the locked position, thus securely linking the frame 70 to the base 90 via the locking mechanism 10. In this manner, the locking mechanism 10 is self-correcting, i.e., the chair 80 does not have to be precisely aligned with the cutout 46 in the latch plate 40 so the locking mechanism 10 to perform its job.

Figure 5:
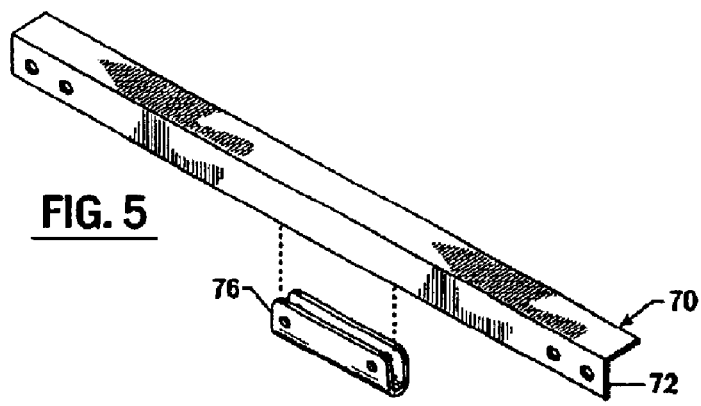
FIG. 5 is a perspective view illustrating installation of a guard on a portion of a chair frame.

In a preferred embodiment, a guard 76 is molded to the portion of the frame 70 that is engaged by the first edge 42 of the latch plate 40. For example, as illustrated in FIG. 5, the guard 76 is molded to opposing surfaces and intervening side of the leg 72 of the L-shaped frame 70. The guard 76 provides a buffer between the material of the frame 70 and the material of the latch plate 40, thereby preventing any binding between the frame 70 and latch plate 40 or wearing away of the material of either the frame 70 or latch plate 40 caused by direct contact therebetween. Preferably, the guard 76 is made of a plastic material, more preferably of high density polyethylene (HDPE). The guard 76 is attached to the frame 70 by rivets, adhesives, or similar fastening methods.

In a preferred embodiment, a handle 30 is attached to the second end 24 of the arm 20. The handle 30 is preferably shaped to allow a person a limited dexterity or flexibility to grasp and turn the handle 30, thereby rotating the arm 20 between the locked and unlocked positions as desired. For example, as illustrated in FIG. 4, the handle 30 is paddle shaped. The handle 30 is made of a light-weight structural material, preferably plastic, and more preferably high impact polystyrene. The handle 30 is affixed to the second end 24 of the arm 20 by adhesives, pressure bonding, locking pins or set screws.

The locking mechanism 10 is used by a person (referred to as an operator) either while sitting in the chair 80 or preliminary thereto. In the illustrations, FIGS. 2A–2C, the locking mechanism 10 initially is in the unlocked (i.e. gliding) position (FIG. 2A). The operator reaches below the chair 80 and grasps and turns the handle 30, rotating the arm 20 from the unlocked position to the locked position (shown in FIG. 2B). The rotation of the arm 20 causes the attached latch plate 40 to rotate as well. The first edge 42 of the latch plate 40 engages the frame 70, which moves toward the cutout 46 in the first edge 42. A portion of the frame 70 is inserted into the cutout 46, thereby forming a rigid link between the frame 70 and the base 90 via the latch plate 40 engaged with the frame 70 and the rotatable arm 20 attached to the base 90 (FIG. 2C). Accordingly, the chair 80 is prevented from gliding, i.e., performing a horizontal back-and-forth motion. The operator 100 rotates the handle 30 in an opposite direction to disengage the latch plate 40 from the frame 70 to allow the chair 80 to execute the gliding motion without restraint.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A glider chair in a recreational vehicle, the glider chair comprising a frame suspended from a base by a gliding mechanism for movement of the frame in a horizontal back-and-forth gliding motion relative to the base and a locking mechanism comprising:

a rotatable arm pivotally attached to a portion of the base;

a latch plate integral to the arm for engagement of a portion of the frame when the arm is rotated to a locked position for disabling the horizontal back-and-forth motion of the chair relative to the base, and for disengagement from the portion of the frame when the arm is rotated to an unlocked position to allow the horizontal back-and-forth motion of the chair relative to the base; and a cutout in the latch plate for insertion of the portion of the frame engaged by the latch plate when the arm is in the locked position.

2. A glider chair in a recreational vehicle according to claim 1, wherein the arm is inserted through openings in the base for pivotal attachment thereto.

3. A glider chair in a recreational vehicle according to claim 1, wherein one end of the arm extends beyond the base for manipulation by an operator.

4. A glider chair in a recreational vehicle according to claim 3, further comprising a handle affixed to the one end of the arm.

5. A glider chair in a recreational vehicle according to claim 4, wherein the handle is shaped to be graspable by the operator.

6. A glider chair in a recreational vehicle according to claim 4, wherein the handle is a paddle.

7. A glider chair in a recreational vehicle according to claim 4, wherein the handle is made of high impact polystyrene material.

8. A glider chair in a recreational vehicle according to claim 1, wherein the cutout is a slot.

9. A glider chair in a recreational vehicle according to claim 1, further comprising a guard affixed to the portion of the frame engaged by the latch plate to prevent wear of the portion of the frame and the latch plate when the arm is rotated between the locked and unlocked positions.

10. A glider chair in a recreational vehicle according to claim 9, wherein the guard is plastic.

11. A glider chair in a recreational vehicle according to claim 9, wherein the guard is made of high density polyethylene.

12. A glider chair in a recreational vehicle according to claim 1, wherein the latch plate is welded to the arm.

13. A glider chair in a recreational vehicle according to claim 1, further comprising spacers disposed on the arm intermediate the latch plate and the base for maintenance of a spaced interval therebetween.

14. A glider chair in a recreational vehicle according to claim 1, wherein the cutout is formed on a edge of the latch plate intermediate opposing sides of the latch plate.

15. A glider chair in a recreational vehicle according to claim 14, where in the edge is sloped generally downwardly from the opposing sides toward the cutout.

16. A glider chair in a recreational vehicle according to claim 1, wherein the arm and the latch plate are made of structural material.

17. A glider chair in a recreational vehicle according to claim 1, wherein the arm and the latch plate are metal.

\* \* \* \* \*